United States Patent Office 3,535,321
Patented Oct. 20, 1970

3,535,321
2-CARBALKOXYAMINODIHYDROQUINAZOLINES
George L. Dunn, Wayne, Pa., assignor to Smith Kline & French Laboratories, Philadelphia, Pa., a corporation of Pennsylvania
No Drawing. Filed Dec. 1, 1967, Ser. No. 687,096
Int. Cl. C07d 51/48
U.S. Cl. 260—256.4        11 Claims

ABSTRACT OF THE DISCLOSURE

Novel acyl derivatives of 2-amino-3,4-dihydroquinazoline, their thio analogues which may be optionally substituted on the benzene nucleus and having activity against helminthiasis in animals are disclosed. A process for their preparation involves reacting an optionally substituted 2-aminoquinazoline with an alkyl haloformate to give the corresponding 2-carboalkoxyaminoquinazoline, which may be subsequently hydrogenated to form the 3,4-dihydro congener.

---

This invention relates to anthelmintic compositions containing acyl derivatives of 2-amino-3,4-dihydroquinazoline, and their thio analogs, their benzene ring substituted analogs, and to method for producing anthelmintic activity using said esters.

According to one aspect of the invention, there are provided an anthelmintic composition and method of producing anthelmintic activity which utilizes as the essential active ingredient novel compounds represented by the general formula:

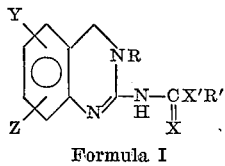

Formula I wherein

R is a lower alkyl group containing from one to five carbon atoms, or preferably hydrogen;
R' is alkyl containing from one to ten carbon atoms; cycloalkyl including alkyl cycloalkyl containing from three to ten carbon atoms; alkenyl straight or branched chain containing from two to ten carbon atoms; alkynyl straight or branched containing from two to ten carbon atoms; phenyl; or naphthyl;
X and X' are oxygen or sulfur, with at least one of them being oxygen; and
Y and Z are hydrogen, alkyl containing from one to ten carbon atoms; lower alkoxy containing from one to ten carbon atoms, trifluoromethyl; amino; halogen, preferably chloro or bromo; hydroxy; lower alkyl thio; dialkylamino; cyano; alkanoylamino containing from two to seven carbon atoms; carboxy; carbalkoxy containing from two to seven atoms; with the alkyl substitutents not specifically defined having from one to six carbon atoms.

It is preferred to use as the active ingredient of the novel compositions of this invention, compounds as shown in Formula II below:

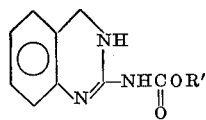

Formula II wherein R' is alkyl containing from one to six carbon atoms; cycloalkyl containing from three to six carbon atoms; or alkenyl containing from two to six carbons. Advantageous and preferred members of Formula II are those where R' is alkyl from one to three carbon atoms.

The acyl derivatives of 2-amino quinazoline, precursors of the part disclosed 3-4 dihydroquinazolines, are also a part of this invention in view of their novelty and utility as intermediates. These precursors are represented by the general formula:

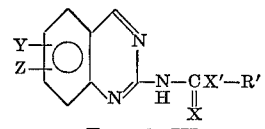

Formula III wherein:

R' is alkyl containing from one to ten carbon atoms; cycloalkyl including alkyl cycloalkyl containing from three to ten carbon atoms; alkenyl straight or branched chain containing from two to ten carbon atoms; alkynyl straight or branched containing from two to ten carbon atoms; phenyl; or naphthyl;
X and X' are oxygen or sulfur, with at least one of them being oxygen; and
Y and Z are hydrogen, alkyl containing from one to fifteen carbon atoms; lower alkoxy containing from one to fifteen carbon atoms, trifluoromethyl; amino; halogen, preferably chloro or bromo; hydroxy; lower alkyl thio; alkylamino; dialkylamino; cyano; alkanoyl containing from two to seven carbon atoms; carboxy; carbalkoxy containing from two to seven atoms; with the alkyl substituents not specifically defined having from one to eight carbon atoms.

To the best of my knowledge none of the here disclosed compounds are known in the art.

Examples of specific compounds falling within Formula I are:

2-carbomethoxyamino-3,4-dihydroquinazoline
2-carbomethoxyaminoquinazoline
2-carbomeththioamino-3,4-dihydroquinazoline
2-carbomeththioaminoquinazoline
2-carboethoxyamino-3,4-dihydroquinazoline
2-carboethoxyaminoquinazoline
2-carboeththioamino-3,4-dihydroquinazoline
2-carboeththioaminoquinazoline
2-carbothiomeththioamino-3,4-dihydroquinazoline
2-carbothiomeththioaminoquinazoline
2-carbopropoxyamino-3,4-dihydroquinazoline
2-carbopropoxyaminoquinazoline
2-carbopropthioamino-3,4-dihydroquinazoline
2-carbopropthioaminoquinazoline
2-carboisopropoxyamino-3,4-dihydroquinazoline
2-carboisopropoxyaminoquinazoline
2-carbobutoxyamino-3,4-dihydroquinazoline
2-carbobutoxyaminoquinazoline
2-carbo-tert-butoxyamino-3,4-dihydroquinazoline
2-carbo-tert-butoxyaminoquinazoline
2-carboisobutoxyamino-3,4-dihydroquinazoline
2-carboisobutoxyaminoquinazoline
2-carbo-sec-butyloxyamino-3,4-dihydroquinazoline
2-carbo-sec-butyloxyaminoquinazoline
2-carbopentoxyamino-3,4-dihydroquinazoline
2-carbopentoxyaminoquinazoline
2-carboisopentoxyamino-3,4-dihydroquinazoline
2-carboisopentoxyaminoquinazoline
2-carbohexoxyamino-3,4-dihydroquinazoline
2-carbohexoxyaminoquinazoline
5-methyl-2-carbomethoxyamino-3,4-dihydroquinazoline
5-methyl-2-carbomethoxyaminoquinazoline
6-n-butyl-2-carbomethoxyamino-3,4-dihydroquinazoline
6-n-butyl-2-carbomethoxyaminoquinazoline
6-ethoxy-2-carbomethoxyamino-3,4-dihydroquinazoline
6-ethoxy-2-carbomethoxyaminoquinazoline
7-propoxy-2-carbomethoxyamino-3,4-dihydroquinazoline 7-propoxy-2-carbomethoxyaminoquinazoline
7-trifluoromethyl-2-carbomethoxyamino-3,4-dihydroquinazoline
7-trifluoromethyl-2-carbomethoxyaminoquinazoline
6-n-amyl-2-carbomethoxyamino-3,4-dihydroquinazoline
6-n-amyl-2-carbomethoxyaminoquinazoline
6-amino-2-carbopropoxyamino-3,4-dihydroquinazoline
6-amino-2-carbopropoxyaminoquinazoline
8-chloro-2-carboethoxyamino-3,4-dihydroquinazoline
8-chloro-2-carboethoxyaminoquinazoline
5-hydroxy-2-carboethoxyamino-3,4-dihydroquinazoline
5-hydroxy-2-carboethoxyaminoquinazoline
8-methylthio-2-carbomethoxyamino-3,4-dihydroquinazoline
8-methylthio-2-carbomethoxyaminoquinazoline
2-carbovinyloxyamino-3,4-dihydroquinazoline
2-carbovinyloxyaminoquinazoline
2-carboethynyloxyamino-3,4-dihydroquinazoline
2-carboethnyloxyaminoquinazoline
2-carboallyloxyamino-3,4-dihydroquinazoline
2-carboallyloxyaminoquinazoline
2-carbomethallyloxyamino-3,4-dihydroquinazoline
2-carbomethallyloxyaminoquinazoline
2-carbodimethallyloxyamino-3,4-dihydroquinazoline
2-carbodimethallyloxyaminoquinazoline
2-carbopropargyloxyamino-3,4-dihydroquinazoline
2-carbopropargyloxyaminoquinazoline
2-carbophenyloxyamino-3,4-dihydroquinazoline
2-carbophenyloxyaminoquinazoline
2-carbonaphthyloxyamino-3,4-dihydroquinazoline
2-carbonaphthyloxyaminoquinazoline
2-carbocyclopropyloxyamino-3,4-dihydroquinazoline
2-carbocyclopropyloxyaminoquinazoline
2-carbo-1-methylcyclopropyloxyamino-3,4-dihydroquinazoline
2-carbo-1-methylcyclopropyloxyaminoquinazoline
2-carbocyclobutyloxyamino-3,4-dihydroquinazoline
2-carbocyclobutyloxyaminoquinazoline
2-carbocyclopentyloxyamino-3,4-dihydroquinazoline
2-carbocyclopentyloxyaminoquinazoline
2-carbocyclohexyloxyamino-3,4-dihydroquinazoline
2-carbocyclohexyloxyaminoquinazoline
5-methyl-2-carbovinyloxyamino-3,4-dihydroquinazoline
5-methyl-2-carbovinyloxyaminoquinazoline
6-methyl-2-carboallyloxyamino-3,4-dihydroquinazoline
6-methyl-2-carboallyloxyaminoquinazoline
7-trifluoromethyl-2-carbomethallyloxyamino-3,4-dihydroquinazoline
7-trifluoromethyl-2-carbomethallyloxyaminoquinazoline
8-amino-2-carbodimethallyloxyamino-3,4-dihydroquinazoline
8-amino-2-carbodimethallyloxyaminoquinazoline
7-chloro-2-carbopropargyloxyamino-3,4-dihydroquinazoline
7-chloro-2-carbopropargyloxyaminoquinazoline
5-hydroxy-2-carbobutynoxyamino-3,4-dihydroquinazoline
5-hydroxy-2-carbobutynoxyaminoquinazoline
8-bromo-2-carbopentynoxyamino-3,4-dihydroquinazoline
8-bromo-2-carbopentynoxyaminoquinazoline
6-methylthio-2-carbohexynoxyamino-3,4-dihydroquinazoline
6-methylthio-2-carbohexynoxyaminoquinazoline
7-bromo-2-carboallyloxyamino-3,4-dihydroquinazoline
7-bromo-2-carboallyloxyaminoquinazoline
6-chloro-2-carboallyloxyamino-3,4-dihydroquinazoline
6-chloro-2-carboallyloxyaminoquinazoline
5-ethoxy-2-carboallyloxyamine-3,4-dihydroquinazoline
5-ethoxy-2-carboalyloxyaminoquinazoline
6-methoxy-2-carboallyloxyamino-3,4-dihydroquinazoline
6-methoxy-2-carboallyloxyaminoquinazoline
5-methyl-2-carboallyloxyamino-3,4-dihydroquinazoline
5-methyl-2-carboallyloxyaminoquinazoline
8-trifluoromethyl-2-carboallyloxyamino-3,4-dihydroquinazoline
8-trifluoromethyl-2-carboallyloxyaminoquinazoline
6-amino-2-carboallyloxyamino-3,4-dihydroquinazoline
6-amino-2-carboallyloxyaminoquinazoline
7-hydroxy-2-carboallyloxyamino-3,4-dihydroquinazoline
7-hydroxy-2-carboallyloxyaminoquinazoline
5-chloro-2-carbomethoxyamino-3,4-dihydroquinazoline
5-chloro-2-carbomethoxyaminoquinazoline
6-amino-2-carbomethoxyamino-3,4-dihydroquinazoline
6-amino-2-carbomethoxyaminoquinazoline
7-dimethylamino-2-carbomethoxyamino-3,4-dihydroquinazoline
7-dimethylamino-2-carbomethoxyquinazoline
8-methyl-2-carbomethoxyamino-3,4-dihydroquinazoline
8-methyl-2-carbomethoxyaminoquinazoline
7-ethyl-2-carbomethoxyamino-3,4-dihydroquinazoline
7-ethyl-2-carbomethoxyaminoquinazoline
5-n-propyl-2-carbomethoxyamino-3,4-dihydroquinazoline
5-n-propyl-2-carbomethoxyaminoquinazoline
6-n-butyl-2-carbomethoxyamino-3,4-dihydroquinazoline
6-n-butyl-2-carbomethoxyaminoquinazoline
5-methoxy-2-carbomethoxyamino-3,4-dihydroquinazoline
5-methoxy-2-carbomethoxyaminoquinazoline
7-ethoxy-2-carbomethoxyamino-3,4-dihydroquinazoline
7-ethoxy-2-carbomethoxyaminoquinazoline
6-n-propoxy-2-carbomethoxyamino-3,4-dihydroquinazoline
6-n-propoxy-2-carbomethoxyaminoquinazoline
5-n-butoxy-2-carbomethoxyamino-3,4-dihydroquinazoline
5-n-butoxy-2-carbomethoxyaminoquinazoline
6-n-pentyl-2-carbomethoxyamino-3,4-dihydroquinazoline
6-n-pentyl-2-carbomethoxyaminoquinazoline
6,7-dimethyl-2-carbomethoxyamino-3,4-dihydroquinazoline
6,7-dimethyl-2-carbomethoxyaminoquinazoline
8-propyl-2-carbomethoxyamino-3,4-dihydroquinazoline
8-propyl-2-carbomethoxyaminoquinazoline
5-n-pentyl-2-carbomethoxyamino-3,4-dihydroquinazoline
5-n-pentyl-2-carbomethoxyaminoquinazoline
6-isopentyl-2-carbomethoxyamino-3,4-dihydroquinazoline
6-isopentyl-2-carbomethoxyaminoquinazoline
7-sec-butyl-2-carbomethoxyamino-3,4-dihydroquinazoline
7-sec-butyl-2-carbomethoxyaminoquinazoline
5-isobutyl-2-carbomethoxyamino-3,4-dihydroquinazoline
5-isobutyl-2-carbomethoxyaminoquinazoline
6-n-hexyl-2-carbomethoxyamino-3,4-dihydroquinazoline
6-n-hexyl-2-carbomethoxyaminoquinazoline
8-n-heptyl-2-carbomethoxyamino-3,4-dihydroquinazoline
8-n-heptyl-2-carbomethoxyaminoquinazoline
6-n-octyl-2-carbomethoxyamino-3,4-dihydroquinazoline
6-n-octyl-2-carbomethoxyaminoquinazoline
2-carbomethoxyamino-3-methyl-3,4-dihydroquinazoline
2-carboethoxyamino-3-ethyl-(4H)-quinazoline
S-methyl-2-(3,4-dihydroquinazolyl)-dithiocarbamate
2-carbocyclopropyloxyamino-3-methyl-(4H)-quinazoline It will be readily apparent to one skilled in this art that certain of the substituted 2-amino-3,4-dihydroquinazoline compounds (R′ is branched) of this invention may have asymmetric carbon atoms, forming optically active $d$- and $l$-compounds. The connotation of the general formulas presented herein is intended to include the separated $d$- or $l$-optical isomers, as well as racemic mixtures of these isomers.

If desired, the isomers may be separated for individual use by resolution methods known to the art, such as fractional crystallization of the $l$-tartrate salts of the carbamates. Alternatively, a synthesis starting with an optically active side chain may yield the desired optical isomer.

The compounds of Formula I being weak bases will normally form salts with inorganic and organic acids. Accordingly, the nontoxic salts formed with pharmaceutically acceptable strong inorganic and organic acids may be alternatively employed in the compositions of the invention. Other nontoxic molecular complexes known to exist that can be derived from compounds of Formula I may also be used in this invention, since the anthelmintic activity rests in the 3,4-dihydroquinazolyl carbamic acid structure itself.

The compounds of Formula I in which R is hydrogen, X is sulfur, and X' is oxygen, are prepared by reacting appropriately substituted 2-amino-3,4-dihydroquinazoline with carbon disulfide and an appropriate alcohol to give the corresponding 2-carbthioalkoxyamino - 3,4 - dihydroquinazoline by refluxing the reaction mixture on a steam bath.

In the case of the compounds of Formula I in which R is lower alkyl, X is sulfur, and X' is oxygen, these may advantageously be prepared by the same general procedure, starting with an appropriately substituted 2-amino-3,4-dihydroquinazoline having a lower alkyl group on the 3-position.

The compounds of Formula I in which R is hydrogen, R' is lower alkyl, X is oxygen, and X' is sulfur, are prepared from the corresponding appropriately substituted 2-carboalkoxyamino-3,4-dihydroquinazoline by treatment thereof with an alkyl halide in a suitable solvent.

The compounds of Formula I in which R is hydrogen, both X and X' are oxygen, and Y and Z may be other hydrogen, are prepared by reacting an appropriately substituted 2-aminoquinazoline with the appropriate R' substituted dialkylpyrocarbonate or alkyl haloformate to give the corresponding 2-carboalkoxyaminoquinazoline. This may be subsequently hydrogenated to form the 3,4-dihydrocongener. The N-alkylated congeners, i.e., where R is alkyl, are prepared by alkylating the 3,4-dihydroquinazoline.

The 2-aminoquinazoline reactant can have substituents on the benzene ring which correspond to Y and Z as defined in Formula I. The resulting quinazolines bear these substituents at the corresponding position of the benzene ring. The nature of the above reactions is such that it is generally applicable to 2-aminoquinazolines regardless of the substituents which may appear on the benzene ring.

An alternative process for making the anthelmintic compounds of this invention starts with an N,N'-bis (carboalkoxy) S-methyl pseudothiourea. The substituted urea is treated with one to two equivalents of an optionally substituted o-aminobenzylamine in aqueous solution, which yields the corresponding 2-carboalkoxyamino-3,4-dihydroquinazoline.

The compounds of Formula I wherein R is hydrogen, R' is lower alkyl, and either or both of Y and Z are alkyl may be prepared starting with the appropriate mono- or di-alkyl substituted o-amino benzylamine (Berichte, 93:2898 (1960)) which is reacted with an N,N'-bis (carbalkoxy)-S-methylpseudothiourea).

The compounds of Formula I wherein R is hydrogen, R' is alkyl and either or both of Y and Z are alkoxy may be prepared starting with the appropriate alkoxy substituted o-aminobenzylamine (F. Kuffner, G. Lennis and H. Bauer, Monatsch., Chem. 91, 1152, 1960) and an N,N'-bis (carbalkoxy)-S-methylpseudothiourea.

The compounds of Formula I wherein R is hydrogen, R' is alkyl, and either or both of Y and Z are $CF_3$ may be prepared starting with a trifluoromethyl o-aminobenzaldehyde (prepared by reduction of the nitro aldehyde with ferrous sulfate) and guanidine to give the appropriate quinazoline, which is then acylated, and reduced catalytically to give the 3,4-dihydro derivative.

The compounds of Formula I wherein R is hydrogen, R' is alkyl, and either or both of Y and Z are halo may be prepared starting with a 5- or 6-haloanthranilaldehyde and guanidine carbonate, which are refluxed in Decalin to yield a 2-amino-6- or 7-haloquinazoline, followed by reduction to the dihydro derivative.

The compounds of Formula I wherein R is hydrogen, R' is alkyl, and either or both of Y and Z are hydroxy may be prepared starting with a benzyloxy o-aminobenzaldehyde (prepared by reducing the nitro compound with ferrous sulfate, Helv. Chim. Acta. 31, 1375 (1948)), and guanidine to give the benzyloxy quinazoline. This is acylated and then reduced catalytically to give the debenzylated 3,4-dihydro derivative.

The compounds of Formula I wherein R is hydrogen, R' is alkyl, and either or both of Y and Z are amino may be prepared starting with a nitro-2-aminobenzaldehyde (U.S. Splitter and M. Calvin, J. Org. Chem., 20, 1086 (1955)) condensing with guanidine, acylating the nitro-2-aminoquinazoline with an alkyl haloformate, and then hydrogenating to give the final product.

The compounds of Formula I wherein R is hydrogen, R' is alkyl, and either or both of Y and Z are alkylthio may be prepared starting with a methylthiobenzaldehyde, for example (J. Chem. Soc. 2831 (1952)), nitrating to get the 5-methylthio-2-nitrobenzaldehyde, then reducing with ferrous sulfate to give the desired 2-amino-5-methylthiobenzaldehyde, which is then condensed with guanidine, acylated with an alkyl haloformate, and hydrogenated to the dihydro compound.

The compounds of Formula I wherein R is hydrogen R' is alkyl, and either or both of Y and Z are dialkylamino may be prepared starting with the appropriate dialkylamino-2-benzylamine and N,N' bis (carbalkoxy) S-methyl pseudothiourea. The dialkylamino-2-aminobenzylamine may be prepared by treating a nitro-N,N-dimethyltoludine with N-bromosuccinimide, the phthalimide, and finally hydrolyzing with hydrazine.

The compounds of Formula I wherein R is hydrogen, R' is alkyl and either or both of Y and Z are cyano may be prepared starting with a cyano-o-aminobenzaldehyde and treating with guanidine carbonate, which is refluxed in Decalin to yield the corresponding 2-aminocyanoquinazoline.

The compounds of Formula I wherein R is hydrogen, amino may be prepared starting with an amino-2-carbo-R' is alkyl and either or both of Y and Z are alkanoyl-alkoxyamino-3,4-dihydroquinazoline, and treating with an alkanoyl chloride in pyridine.

The compounds of Formula I wherein R is hydrogen, R' is alkyl and either or both of Y and Z are carboxy may be prepared starting with a carboxy-o-benzylamine and the appropriate thiopseudourea. The carboxybenzylamine derivative may be formed by reduction of the carboxyamino-nitrile obtained from carboxy isatin, according to the method of Bedford et al., J. Chem. Soc., 1633 (1959).

The dihydroquinazolines of Formula I have been found to possess useful anthelmintic properties, that is, broad spectrum activity against parasites of warm blooded animals, including both mature and immature parasitic forms. In particular, these compounds have been found to exhibit high activity against various helmintic infections of the intestinal tract of economically important animals, coupled with low systemic toxicity to the host animal.

For example, the disclosed compounds are generally effective in clearing mice of worm infections for laboratory purposes, among others: *Syphacia obvelata* and *Aspicularis tetraptera* (mouse pinworm), *Nematospiroides dubius* (mouse hookworm), and the migratory stages of *Ascaris suum*.

Other susceptible helminths include *Toxocara canis*, found in naturally infested dogs. Also, parasitic to this host are *Ancylostoma caninum*, *Trichuris vulpis* (whipworm), and Physalaptera spp.

Compounds of Formula I are useful against parasitic gastroenteritis in sheep, such as *Haemonchus contortus*, Ostertagia spp., Trichostrongylus spp., Nematodirus spp., *Trichuris ovis*, Cooperia spp., and *Strongyloides papillosus*. Bunostomum trigonocephalum and Oesophagostomum spp., are other important parasites of sheep.

Animals of low weight are treated with unit doses ranging no higher than a few milligrams; whereas animals of high body weight, such as ruminants, require proportionately larger unit doses ranging up to several grams. Preferably, a single dose is administered daily for each animal species based on the weight of that species.

The amount of ingredient administered will depend on the weight of the host, but will usually be between about 1 mg./kg. and 500 mg./kg. of body weight daily.

For example, 2-carbomethoxyamino-3,4-dihydroquinazoline at an oral daily dose of 50 mg./kg. tested in clearing mice of natural pinworm infection, following generally the method of McCowen et al., reported in the American Journal of Tropical Medicine, 6–894 (1957), gave a 64% result in terms of worms cleared; while a 100 mg./kg. dose gave 73%. Its $LD_{50}$ in mice is in excess of 100 mg./kg.

The novel compounds of this invention may be administered orally or parenterally in conventional dosage unit forms such as tablets, capsuls, injectables or the like, by incorporating the appropriate dose of a compound of Formula I with carriers.

In practice, a pharmacologically active compound of structural Formula I is usually formulated with a non-toxic carrier therefor to give anthelmintic compositions of this invention. The carrier may be an orally ingestible container for the active ingredientt, for example, a hard or soft gelatin capsule; or it may be a pharmaceutically acceptable diluent or excipient of the kind normally used in the production of medicaments, ready for use, for example, maize starch, terra alba, lactose, sucrose, calcium phosphate, gelatin, talcum, stearic acid, magnesium stearate, dextrin, agar, pectin or acacia.

Exemplary of liquid carriers are peanut oil, olive oil, sesame oil, and water. Similarly, the carrier or diluent may include a time delay material such as glyceryl monostearate or glyceryl distearate alone or with a wax.

A wide variety of pharmaceutical forms can be employed. Thus, if a solid carrier is used, the preparation can be tableted, placed in a hard gelatin capsule, or compounded in the form of a troche or lozenge. The amount of solid carrier will vary widely but preferably will be from about 25 mg. to about 3 gm. If a liquid carrier is used, the preparation may be in the form of a soft gelatin capsule, placed in an ampule or in liquid suspension.

The compositions are most often made up in a form suitable for internal administration and may therefore take the form of a liquid, for example, an emulsion or a sterile solution or suspension in water, oil, such as arachis oil, or other liquid.

The compositions are advantageously made up in a dosage unit form adapted for the desired mode of administration. Thus for the preferred oral administration, the dosage unit may take the form of a suspension, tablet, packaged powder, bolus, or encapsulated powder. The quantity of active ingredient in each dosage unit will be such that one or more units are required for each therapeutic administration.

As previously mentioned, the compounds of Formula I have general anthelmintic activity and accordingly a further and most important aspect of this invention provides a method of treating helmintic infections in an animal which comprises administering, usually orally, to the animal in a sufficient nontoxic, but effective, dose an anthelmintic compound falling within the definition of Formula I, generally in the form of a pharmaceutical or veterinary composition as hereinbefore described. The daily dose range commonly used is from about 1 mg./kg. to about 500 mg./kg. depending on the species of host and regimen used. One dose per day administration is preferred but up to five of the dosage units described above may be used if desired.

Where tableting is used, the resulting tablets are then coated with methyl methacrylate to form an enteric coating, i.e. a coating which is substantially insoluble in gastric secretion but substantially soluble in intestinal fluids.

It will be appreciated that the active ingredient used in the formulation of the tablets described above may be replaced with other compounds of Formula I having the necessary anthelmintic activity. Furthermore, other materials may be used to form the enteric coating, for example other synthetic plastic materials such as methyl acrylate, cellulose derivatives, hydrogenated castor oil or phthalates.

The compositions thusly prepared are administered, usually orally, to an infected host from 1–5 times daily for anthelmintic activity.

The following examples illustrate syntheses which may be employed in formulating the compositions of the invention but are not considered limiting the invention described herebefore.

EXAMPLE 1

Preparation of 2-carbomethoxyaminoquinazoline

A mixture of 200 mg. of 2-aminoquinazoline, and .3 ml. of dimethylpyrocarbonate heated on a steam bath for 1.5 hours. Upon cooling, a yellowish solid product forms which is purified by recrystallization from acetonitrile. After drying in vacuo, the product has a M.P. of 152–154° C.

EXAMPLE 2

Preparation of 2-carbomethoxyamino-3,4-dihydroquinazoline

To 60 ml. of absolute ethanol is added 100 mg. of palladium catalyst (5% by weight on charcoal). 2-carbomethoxyaminoquinazoline (100 g.) is then added to the catalyst suspension. The reaction mixture is put in a hydrogen bomb on a Parr shaker for two hours, starting at 60 p.s.i., during which time about one p.s.i. is taken up, yielding a white solid, M.P. 213° C. (d). After recrystallization from acetonitrile, and cooling at about 0° C., the solid which precipitates is filtered off, yielding 70 mg. of pure product, M.P. 215° C. (d).

EXAMPLE 3

Preparation of 2-carbomethoxyamino-3,4-dihydroquinazoline o-Aminobenzylamine (1.08 g.) is dissolved in 10 ml. $H_2O$, followed by the addition of 206 g. of N,N'-bis (carbomethoxy)-S-methyl thiopseudourea, and then by 10 ml. $H_2O$ more. Heating to reflux dissolves reactants, which is followed by precipitation of an oil. Alcohol (10 ml.) is added to effect resolution. After refluxing for about an hour, a white solid precipitates, which is filtered, and water washed, M.P. 204–210° C. (d).

Upon recrystallization from 235 ml. of acetonitrile, followed by cooling at 0° C. overnight, white solid needles of the product form, M.P. 215° C. (d).

EXAMPLE 4

Typical cattle bolus containing an anthelmintic described herein

|  | Grams |
|---|---|
| 2-carbomethoxyamino-3,4-dihydroquinazoline | 2.0 |
| Calcium phosphate | 2.5 |
| Maize starch | 0.54 |
| Talcum | 0.14 |
| Gum arabic | 0.15 |
| Magnesium stearate | 0.05 |

The calcium phosphate and the anthelmintic compound are thoroughly mixed, and the mixture reduced to a particle size finer than 60 mesh. About one-half of the starch is added, as an aqueous paste, and the resulting mixture granulated. The granules are passed through a #10 mesh screen and dried at 110–130° F. for about 8 hours. The dried materials then passed through a #16 mesh screen. The guar gum and the balance of the starch are added and the mixture thoroughly blended. Finally, the remainder of the ingredients are added and the entire mass thoroughly mixed and compressed into a bolus. The magnesium stearate, talcum and gum acacia are of a particle size to pass a #10 mesh screen.

EXAMPLE 5

Typical sheep drench containing an anthelmintic described herein

| | Parts by weight |
|---|---|
| 2-carbomethoxyamino-3,4-dihydroquinazoline | 60 |
| Terra Alba English | 35.5 |
| Tragacanth, U.S.P. | 3.0 |
| Sodium lauryl sulfate | 1.5 |
| Water. | |

The above solid components are thoroughly mixed, giving a water dispersible powder. This powder can be directly admixed with water in concentrations on the order of 5 g. of powder to 5 cc. of water.

EXAMPLE 6

Preparation of 2-carboalkoxyamino-3,4-dihydroquinazoline

When the following substituted pyrocarbonates are used in place of the dimethyl pyrocarbonate of Example 1, the corresponding listed products are obtained.

| Starting material | Product |
|---|---|
| Diethylpyrocarbonate | 2-carboethoxyamino-3,4-dihydroquinazoline. |
| Di-isopropylpyrocarbonate | 2-carboisopropoxyamino-3,4-dihydroquinazoline. |
| Di-n-butylpyrocarbonate | 2-carbobutoxyamino-3,4-dihydroquinzaoline. |
| Di-cyclopropylpyrocarbonate | 2-carbocyclopropoxyamino-3,4-dihydroquinazoline. |
| Di-cyclopentylpyrocarbonate | 2-carbocyclopentoxyamino-3,4-dihydroquinazoline. |
| Di-vinylpyrocarbonate | 2-carbovinyloxyamino-3,4-dihydroquinazoline. |
| Di-allylpyrocarbonate | 2-carboallyloxyamino-3,4-dihydroquinazoline. |

EXAMPLE 7

Preparation of substituted 2-carbomethoxyamino-3,4-dihydroquinazoline

When the following substituted o-aminobenzylamines are used in place of the o-aminobenzylamine of Example 3, the corresponding listed products are obtained.

| Starting material | Product |
|---|---|
| 6-methyl-2-aminobenzylamine | 5-methyl-2-carbomethoxyamino-3,4-dihydroquinazoline. |
| 5-ethoxy-2-aminobenzylamine | 6-ethoxy-2-carbomethoxyamino-3,4-dihydroquinazoline. |
| 4-trifluoromethylbenzylamine | 7-trifluoromethyl-2-carbomethoxyamino-3,4-dihydroquinazoline. |
| 2,5-diaminobenzylamine | 6-amino-2-carbomethoxyamino-3,4-dihydroquinazoline. |
| 3-chloro-2-aminobenzylamine | 8-chloro-2-carbomethoxyamino-3,4-dihydroquinazoline. |
| 6-hydroxy-2-aminobenzylamine | 5-hydroxy-2-carbomethoxyamino-3,4-dihydroquinazoline. |
| 5-nitro-2-aminobenzylamine | 6-nitro-2-carbomethoxyamino-3,4-dihydroquinazoline. |
| 3-methylthio-2-aminobenzylamine | 8-methylthio-2-carbomethoxyamino-3,4-dihydroquinazoline. |
| 5-n-butyl-2-benzylamine | 6-n-butyl-2-carbomethoxyamino-3,4-dihydroquinazoline. |

EXAMPLE 8

Preparation of 6-chloro-2-carbopropoxyamino-quinazoline

A mixture of 5-chloroanthranilaldehyde (1.55 g.) (prepared according to a procedure described for the preparation of anthranilaldehyde Org. Synthesis, Coll. Vol. 3, p. 56) and guanidine carbonate (1.80 g.) in 50 ml. of Decalin is heated at reflux for two hours. Then the mixture is filtered hot, to remove unreacted guanidine carbonate, and the filtrate cooled to give 2-amino-6-chloroquinazoline.

A solution of 2-amino-6-chloroquinazoline (1.78 g.) in 25 ml. of dry pyridine is cooled in ice and treated dropwise with n-propyl chloroformate (1.34 g). When addition is complete the mixture is heated at reflux for one hour, cooled and then poured into ice water. The solid precipitate is collected and recrystallized to yield 6-chloro-2-carbopropoxyaminoquinazoline.

EXAMPLE 9

Preparation of 6-chloro-2-carbopropoxyamino-3,4-dihydroquinazoline

A solution of 6-chloro-2-carbopropoxyaminoquinazoline (4 g.) in 200 ml. of alcohol, containing 0.4 g. of 5% palladium-on-carbon catalyst, was hydrogenated at 60 p.s.i. until hydrogen uptake ceased. The solvent was removed by heating in vacuo and the solid residue recrystallized to give the desired product as a colorless solid; 6-chloro-2-carbopropoxyamino-3,4-dihydroquinazoline.

EXAMPLE 10

Preparation of 2-carbomethoxyamino-7-methoxy-3,4-dihydroquinazoline

A mixture of 2-amino-4-methoxybenzylamine (1.52 g.) (prepared as described by F. Kuffner, G. Lenneis and H. Bauer, Monatch Chem., 91, 1152 (1960)) and N,N'-bis (carbomethoxy) - 1-S-methyl thiopseudourea (1.56 g.) in 25 ml. of water was heated at reflux until evolution of methyl mercaptan ceased. Sufficient alcohol was added to dissolve any precipitate and then the mixture was heated at reflux for one hour. After cooling in ice the precipitated solid is collected and washed with water. Recrystallization of the crude product from aqueous alcohol gave the desired compound as a colorless solid.

I claim:

1. A 3,4-dihydroquinazoline having the structural formula:

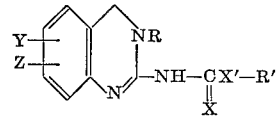

wherein
R is hydrogen or lower alkyl having one to five carbon atoms;
R' is alkyl having one to ten carbon atoms; cycloalkyl including alkyl cycloalkyl, said cycloalkyl containing three to ten carbon atoms; or alkenyl, straight or branched, containing two to ten carbon atoms;
X and X' are either oxygen or sulfur, with at least one of them being oxygen; and
Y and Z are hydrogen, lower alkyl containing from one to ten carbon atoms; lower alkoxy containing from one to ten carbon atoms, trifluoromethyl, chloro, bromo, alkyl thio, or dialkylamino, with the alkyl substituents not specifically defined having one to seven carbon atoms.

2. A compound of claim 1 wherein R, Y and Z are all hydrogen, and X and X' are both oxygen.

3. A compound of claim 1 wherein R, Y and Z are all hydrogen, X and X' are both oxygen, and R' is methyl.

4. A compound of claim 1 wherein X and X' are oxygen, R and Z are hydrogen, R' is methyl, and Y is 6-n-butyl.

5. A compound of claim 1 wherein X and X' are oxygen, R and Z are hydrogen, R' is methyl, and Y is 7-propoxy.

6. A compound of claim 1 wherein X and X' are oxygen, R and Z are hydrogen, R' is methyl, and Y is 6-n-amyl.

7. A compound of claim 1 wherein X and X' are oxygen, R and Z are hydrogen, R' is methyl, and Y is 7-n-butyl.

8. A compound of claim 1 wherein X and X' are oxygen, R and Z are hydrogen, R' is methyl, and Y is 5-methyl.

9. A compound of claim 1 wherein X and X' are oxygen, R and Z are hydrogen, R' is methyl, and Y is 6-methoxy.

10. A compound of claim 1 wherein X and X' are oxygen, R and R' are methyl, and Y and Z are hydrogen.

11. A compound of claim 1 wherein X and X' are oxygen, R is hydrogen, R' is methyl, and Y and Z are 6 and 7-methoxy, respectively.

References Cited

UNITED STATES PATENTS

| | | | |
|---|---|---|---|
| 3,075,982 | 1/1963 | Tietze et al. | 260—256.4 |
| 3,120,523 | 2/1964 | Petersen et al. | 260—256.4 |
| 3,177,218 | 4/1965 | Brown | 260—256.4 |

ALEX MAZEL, Primary Examiner

R. J. GALLAGHER, Assistant Examiner

U.S. Cl. X.R.

260—256.5; 424—251